(12) United States Patent
Foster et al.

(10) Patent No.: US 6,801,536 B1
(45) Date of Patent: Oct. 5, 2004

(54) REMULTIPLEXING AUDIO/VIDEO PES STREAMS FROM AN MPEG TRANSPORT SYSTEM

(75) Inventors: Eric M. Foster, Owego, NY (US); Dennis E. Franklin, Endicott, NY (US); Wai Man Lam, Moheganlake, NY (US); Raymond E. Losinger, Endicott, NY (US); Chuck H. Ngai, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/534,643

(22) Filed: Mar. 23, 2000

(51) Int. Cl.[7] .......................... H04L 12/28; H04L 12/56
(52) U.S. Cl. ....................................... 370/412; 370/389
(58) Field of Search ................................ 348/461, 462,
348/464, 465, 467, 469, 473, 478, 495,
497, 500, 510, 512, 518, 720, 725, 515;
370/313, 389, 392, 394, 412, 413, 414,
415, 416, 417, 418, 419, 420, 421, 466,
468, 469, 471, 473, 474, 476, 509, 510,
512, 516, 517, 519, 395; 375/224, 226,
228, 354, 355, 357, 363, 364, 365, 366,
369, 371

(56) References Cited

U.S. PATENT DOCUMENTS

| | | | | |
|---|---|---|---|---|
| 5,121,205 A | * | 6/1992 | Ng et al. ..................... 348/568 |
| 5,497,404 A | * | 3/1996 | Grover et al. ........... 375/240.27 |
| 5,548,792 A | * | 8/1996 | Babonneau .................. 710/39 |
| 5,666,293 A | * | 9/1997 | Metz et al. .................. 709/220 |
| 5,726,989 A | * | 3/1998 | Dokic ......................... 370/509 |
| 5,742,623 A | * | 4/1998 | Nuber et al. ................ 714/798 |
| 5,774,497 A | * | 6/1998 | Block et al. ................ 375/226 |
| 5,784,119 A | | 7/1998 | Noda et al. |
| 5,801,781 A | * | 9/1998 | Hiroshima et al. .......... 348/441 |
| 5,818,539 A | * | 10/1998 | Naimpally et al. .......... 348/512 |
| 5,832,256 A | * | 11/1998 | Kim ............................ 713/501 |
| 5,835,493 A | * | 11/1998 | Magee et al. ........... 370/395.62 |
| 5,856,973 A | * | 1/1999 | Thompson .................. 370/389 |
| 5,867,230 A | * | 2/1999 | Wang et al. ............. 348/425.2 |
| 5,907,366 A | * | 5/1999 | Farmer et al. .............. 348/478 |
| 5,913,031 A | * | 6/1999 | Blanchard ................... 709/204 |

(List continued on next page.)

FOREIGN PATENT DOCUMENTS

| | | | |
|---|---|---|---|
| JP | 11-88878 | * | 3/1999 |
| JP | 11-163817 | * | 6/1999 |
| WO | WO 97/00580 | * | 1/1997 |
| WO | WO 99/00986 | * | 1/1999 |
| WO | WO 99/37048 | * | 7/1999 |

*Primary Examiner*—Wellington Chin
*Assistant Examiner*—Jamal A. Fox
(74) *Attorney, Agent, or Firm*—Whitham, Curtis & Christofferson, P.C.; William H. Steinberg

(57) ABSTRACT

Two data streams derived from a transmitted data stream are remultiplexed with a coarser granularity for storage in data blocks which assure that corresponding portions of each of the two data streams are made available in the same data block. The data streams are buffered in queues from which sub-blocks are transferred as buffer sections having sizes corresponding to relative bit rates therein in the order the sub-blocks are filled, preferably using bytes to interrupt processing. Thus, the sub-blocks will be grouped into data blocks in accordance with the correspondence of the data streams such as the time correspondence of audio and video data. As applied to digital video data transmissions, a system time clock (STC) value is stored in a sub-block header and/or a data block header and, using a look-up table or other arrangement for estimating a storage location, a data block can be retrieved from storage in accordance with a target STC value.

20 Claims, 6 Drawing Sheets

U.S. PATENT DOCUMENTS

| | | | |
|---|---|---|---|
| 5,914,941 A | * | 6/1999 | Janky .......................... 370/313 |
| 5,949,792 A | * | 9/1999 | Yasuda et al. .............. 370/474 |
| 5,953,691 A | * | 9/1999 | Mills .......................... 702/198 |
| 5,966,385 A | * | 10/1999 | Fujii et al. ................. 370/465 |
| 5,973,685 A | * | 10/1999 | Schaffa et al. .............. 345/722 |
| 6,157,674 A | * | 12/2000 | Oda et al. ................... 375/240 |
| 6,192,427 B1 | * | 2/2001 | Li et al. ....................... 710/52 |
| 6,211,800 B1 | * | 4/2001 | Yanagihara et al. .......... 341/50 |

* cited by examiner

REMULTIPLEXING AUDIO/VIDEO PES STREAMS FROM AN MPEG TRANSPORT SYSTEM

BACKGROUND OF THE INVENTION

1. Field of the Invention

The present invention generally relates to transmission and presentation of broadcast digital video and audio program content and, more particularly, to storage of audio and video streams received from digital transmission media and navigation of stored data to locate audio and video data streams associated with a given time period in a program.

2. Description of the Prior Art

Since its invention, television has been recognized to have great economic and social potential. At the present time, when wide bandwidth transmission systems such as coaxial cable systems are becoming relatively ubiquitous, much of the economic and social potential derives from the variety of programming or other information which can be provided to users and the willingness of users to pay for access to particular information, such as pay-per-view movies at a time convenient to them.

While coaxial cable distribution systems provide very substantial numbers of choices of information available as well as some capacity for so-called upstream signalling and even Internet communications of increased speed relative to telephone/modem arrangements, there is increased demand for wider variety and flexibility of programming which can only be provided, at the present state of the art, through digital communications using extremely broad band transmission media such as microwave and fiber optic links.

Even with these broad band communication media, the required capacity, the volume and variety of data contained in common programming requires extreme compression to support the number of separate communications which may be required to be transmitted over a communication link of finite although substantial capacity. Accordingly, a compression convention referred to as MPEG (Motion Picture Experts Group has been promulgated in several versions (e.g. MPEG-2) and has become an industry standard. This standard is extremely flexible and adaptive to transmission content to allow extreme compression and is largely compatible with error recovery and hiding arrangements which support acceptable video and audio playback even though the digital transmission medium is considered "lossy" and reception of data with missing or corrupted segments or packets is a common occurrence.

In order to implement this compression convention, a so-called "set-top box" (STB), also referred to as a "target decoder", has been developed and, at the current time, has a well-established architecture. The processing of which the STB is capable is, of course, very substantial since MPEG compression is very complex.

While little storage is required (or possible due to time constraints of substantially real-time presentation) during normal decoding of data transmitted in accordance with the MPEG-2 standard, public familiarity with the functions of video cassette recorders (VCRs) has generated substantial demand for similar functions in a STB. Accordingly, STBs with substantial storage within the STB have been proposed and provision is also sometimes made for further storage on an outboard mass storage device such as a hard disk drive or compact disk recorder/playback device.

Additionally user demand for specialized features and image enhancement has required substantially increased complexity beyond the demands of MPEG processing. For example, a separate microprocessor and substantial memory is generally included and dedicated to provide user-definable functions such as overlays, picture-in-picture displays, graphics overlays, image morphing and other image manipulations. This additional hardware complexity has pushed the cost of the STB close to the limit of consumer acceptance and economic viability. Therefore, additional functions may only be included if they can be implemented very economically with little additional hardware and without significant use of the additional dedicated microprocessor.

However, storage of received programming under the MPEG-2 standard so that the user may have control of playback and review of program content presents significant practical problems. Under the MPEG compression and decompression convention, audio and video are separately processed in separate packetized elementary streams (PESs). If recording is provided, these PESs are separately recorded (in encoded and compressed form to reduce data volume) with periodic but relatively infrequent signals for the maintenance of synchronization. This leads to inefficiencies in recording data to be presented concurrently in separate areas or sectors of the recording medium and difficulty in reassociation of a random point in a video or audio sequence with a corresponding point in the complementary audio or video sequence.

Therefore, when recording and user controllable playback facilities are provided, the user experiences difficulty in locating a particular desired point to begin playback in either the audio or video sequence and substantial and irritating delays are encountered in associating the complementary program sequence with the selected audio or video sequence (e.g. from which the selection is made). Additionally, recording different data having similar Presentation Time Stamps (PTSs) in different sectors requires additional head movement of a transducer head between often widely separated regions of the recording medium. It can be appreciated that when blocks of data in different sectors must be frequently read (e.g. to accommodate about 1 MByte/second at 64 KBytes/block where possibly as few as one block may be in a sector), increased wear on the recording device is caused. More importantly, however, substantial amounts of time and effective bandwidth of the recording device are consumed.

At the present state of the art, no solution has been proposed for improving efficiency of storage consistent with MPEG compliant STB architecture which can be implemented with an economically acceptable increase in hardware or processing burden. Further, the bandwidth requirements for navigating, searching and processing streaming data to selected desired locations therein cannot generally be accommodated, especially in an economical fashion, by known mass storage devices when different sectors must be read in concurrent short time frames.

SUMMARY OF THE INVENTION

It is therefore an object of the present invention to provide a technique of storing separate data streams with related portion (e.g. by presentation time) together in a single compressed data stream and to reduce transducer head movement and recover the separate data streams upon read out from storage.

It is another object of the invention to provide a technique of limitation of searching and processing of streaming data to locate desired portions thereof while avoiding large bandwidth requirements.

In order to accomplish these and other objects of the invention, a method of multiplexing data streams for storage is provided including steps of buffering each of first and second data streams, defining sub-blocks in each of the first and second data streams by which said sub-blocks are read out to a multiplexer, preferably using bytes-to-interrupt (BTI) processing, queueing the subblocks into data blocks in the order the sub-blocks are defined or BTI interrupts are issued, and storing said data block in a storage device. Headers are preferably built and queued with the sub-blocks for storage. If a system time clock (STC) value is included in the header, a target STC value can be computed or derived from a current STC value and used to access a data block which contains the target STC signal, preferably using a look-up table correlating STC values with storage locations.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
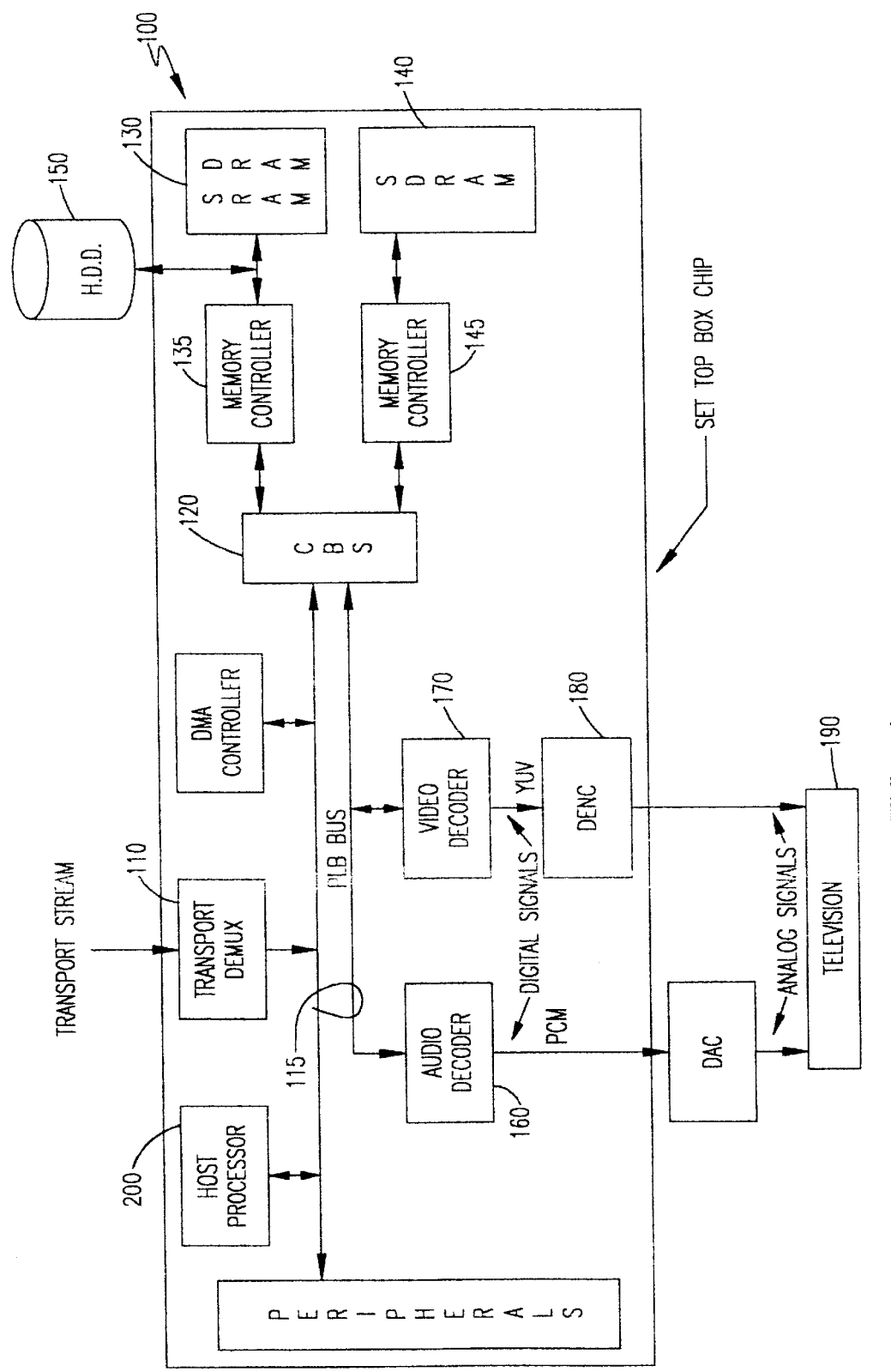
FIG. 1 is a high-level schematic diagram of an exemplary architecture for an MPEG-2 compliant set-top box or target decoder.

Referring now to the drawings, and more particularly to FIG. 1, there is shown a high-level block diagram illustrating an exemplary architecture of an MPEG compliant set-top box (STB) chip 100. It should be appreciated that while the architecture depicted is generally known to those skilled in the art, no portion of FIG. 1 is admitted to be prior art in regard to the present invention. Further, it is a meritorious effect of the present invention that it may be implemented within the architecture of FIG. 1 without significant modification thereof. Accordingly, at the level of abstraction with which FIG. 1 is arranged, FIG. 1 is also illustrative of the preferred architecture with which the invention may be implemented.

Many of the functional elements of the STB chip architecture 100 will be familiar to those skilled in the art and need not be discussed in connection with the invention. It is sufficient to convey an understanding of the invention and to enable practice thereof to note that the MPEG transport stream is input thereto and demultiplexed at demultiplexer 110 where it is converted to a compressed and encoded, preferably packetized elementary stream (PES), format, including separate audio and video streams. The separate audio and video streams are provided to respective audio and video decoders which decompress and decode the PES streams into signals suitable for input to a television set. If program storage is provided, these signals are also placed on a processor local bus (PLB, an internal data bus) 115 and provided to cross-bar switch (CBS) 120 and stored in memories 130, 140 under control of respective memory controllers 135, 145 responsive to host processor 200 communicating to the memory controllers through CBS 120.

It is generally preferable to also queue data in a buffer configured in dynamic memory prior to writing to a mass storage device such as a hard disk drive (HDD) or a compact disk (CD) recorder/player. This latency in DRAM allows improved error correction to be done, as described in concurrently filed U. S. Patent Application Ser. No. 09/535,001 (IBM Docket END000011US1) assigned to the assignee of the present application and which is hereby fully incorporated by reference. There is also a corresponding buffer latency during readout which is available for correction of errored data. Error correction can also be carried out on data retrieved from memory but which is not necessary for immediate display/playback whenever the processor is available.

Queueing data in this fashion also provides for use of data blocks of an arbitrary fixed size for writing to memory which simplifies timing of the write and read operations as well as a preferred increased (coarser) granularity of the data which serves to reduce the number of separate write operation set ups that must be performed under control of the host processor. Queueing also facilitates a form of encryption, if desired, as disclosed in concurrently filed U. S. Patent Application Ser. No. 09/535,001 (IBM Docket END000010US1) assigned to the assignee of the present application and which is hereby fully incorporated by reference.

Since the architecture of the MPEG-2 set-top box separates audio and video data into two separate PES streams, two separate queues are generally required to maintain this separation as the data is prepared for storage. As is known, the granularity of the PES streams is coarser than the relatively very small packet size of the transport stream. The transport packet length is limited to 188 bytes by the MPEG-2 convention in order to facilitate isolation of errors over transmission media which may be considered "lossy". At the same time, the amount of data required for video is much larger than the amount required for audio, even in extremely compressed form. (There is much greater redundancy from frame to frame in a motion picture than in sequential groups of audio data and a much greater degree of compression can thus be achieved with video signals. Nevertheless, even compressed data video signals are about 20 to 80 times larger than audio for a given time increment.)

It should be understood that, under the MPEG-2 convention, substantial pre-processing of the signal prior to transmission need not be done in real time and the data can be more or less rigorously analyzed to determine the form of compression to be used. The nature of the compression used is then indicated in the header of each audio or video packet so that the decoding and decompression can be rapidly performed at the set-top box receiving the program transmission signal, including the number and correspondence of transport stream bytes in respective transport stream packets to packets in the PES streams. Accordingly, the size of packet used in the transport stream can be made small for error isolation while larger granularity of PES stream packets can be established at the set-top box along with separation of the audio and video PES streams with the packets of the respective PES streams articulated in a manner which facilitates synchronization for presentation. By the same token, an even larger granularity may be established for data blocks to facilitate storage operations by buffering PES stream packets in dynamic memory, as alluded to above.

At the same time, as a practical matter, economies of hardware must be observed and the original program data must be encoded, compressed and transmitted in a manner that, in combination with the specific design of the set-top box, registers in the set-top box do not overflow or underflow and that audio and video PES packets that are to be concurrently presented are available when needed. How these necessary conditions are achieved at the transmitter is unimportant to the practice of the invention but it should be understood that the invention exploits these conditions in several ways such as the transmission of system time clock (STC) signals which are interpreted and compared with a local clock in the set-top bow box to synchronize the receiver, demultiplexer and other elements of the set-top box to the signal being received.

The process of comparing the STC to the local time clock and adjusting the latter and the structure for performing the process is collectively referred to as the clock recovery loop which is well-understood by those skilled in the art. The important aspect of this process in regard to the present invention is that STC information and other information related thereto such as the Presentation Time Stamp (PTS) is derived from program clock reference (PCR) information (correlated with the STC) contained in the transport stream packets and remains with the demultiplexed PES packets throughout the presentation and/or storage process.

Other aspects of the exploitation of the MPEG-2 convention important to the practice of the invention will now be explained in connection with FIG. 2 and FIG. 3. This discussion will explain the establishment of coarser granularity which supports reliability and robustness of the invention and will be based on sizes of registers which are currently preferred. However, it should be understood that, within certain limits and constraints which will be evident to those skilled in the art, the size of buffers and the corresponding sizes of packets and data blocks developed thereby are essentially arbitrary and the particular sizes discussed and illustrated should be regarded as exemplary.

Specifically, the transport stream 210 includes packets of 188 bytes in length including a header of four bytes. (Reception of the transport stream is also illustrated at 310 of FIG. 3.) Each of these packets contains a distinct type of data such as audio or video data and the type of data is indicated in the header of the respective packet. As shown at 212, the arrangement of these packets in regard to the types of data contained therein is substantially arbitrary as long as they are sufficiently interspersed such that complete PES packets to be concurrently presented are available when needed and the difference in volume of data between types of data (which is very large between audio and video data) is accommodated. This is easily accomplished at the transmitter.

Since the transport packets are always be received in the correct order, buffers (e.g. FIFO buffers) 222A and 222V are provided in the transport demultiplexer 220 which are at least a small multiple of the transport packet size. A buffer size of 512 bytes for audio and video is defined by the MPEG-2 standard. This feature of the MPEG-2 standard may be considered as implementing a "leaky bucket model" wherein audio and video data are intermittently received at a rate of 60 Mb/second and withdrawn from the buffer at a continuous rate of 15 Mb/second for video and 200–300 Kb/second for audio. Thus the respective audio and video buffer sizes guarantee no overflow of the buffers.

In accordance with the invention, a "bytes-to-interrupt" (BTI) signal is applied to the headers of the audio and video PES streams. A BTI is an interrupt after arbitrary processing (e.g. storage) of an arbitrary number of bytes, preferably in groups of 256 bytes or multiples thereof. These respective BTI numbers will differ greatly in accordance with the size of the respective audio and video PES packets. It is preferred that the BTI values be set to develop an audio PES packet size of 512 bytes and a video PES packet size of 64 K bytes, approximating the ratio of the respective data rates in these channels and corresponding to the respective sizes of buffers 240A and 240V where the data in the respective audio and video streams is queued.

The respective BTI values establish when each stage of buffers 240A and 240V has been filled and the next stage of each buffer is read out to multiplexer 260 in the order the interrupts are issued. As this data is buffered and read, the BTI values assure that the data does not overflow or underflow the respective stages of these buffers (which are functionally the same as the respective audio and video decoder queues and may be considered as such but implementation in separate hardware is preferred and, as a practical matter, effectively necessary).

The BTI is thus a rolling interrupt that indicates when a given number of bytes (in 256 byte increments), forming sub-blocks have been sent to a queue. The action of reading out to the multiplexer 260 in the order BTIs are issued assures that the audio PES packets will be properly interleaved with video PES packets to be available, in order within data blocks, to be stored together and, when read out, to be concurrently presented therewith. In this connection, it should be recalled that the video data rates are much higher than the audio data rates and there will be approximately the same numbers of 512 byte audio data sub-blocks as 64 K byte video data sub-blocks and transfer to the multiplexer in interrupt order assures that audio and video data sub-blocks with the most proximate presentation time stamps will always be adjacent each other in order within the larger total data block size, as stored.

Upon the issuance (330 of FIG. 3) of each BTI interrupt and as a data sub-block is sent to multiplex buffer 280, a header is created for each sub-block that contains the length of the header and sub-blocks, the system time clock value or other clock reference, a pointer to the previous subblock, and a header ID. This information for the header is developed concurrently with the storage of data sub-blocks to multiplex buffer 280, as indicated at 350 and the headers built, as indicated at 340 and combined with the data sub-blocks upon read out from buffers 240A, 240V by queueing to the DMA process for storage, as indicated at 360, 370 in order, through multiplexer 260.

Figure 3:
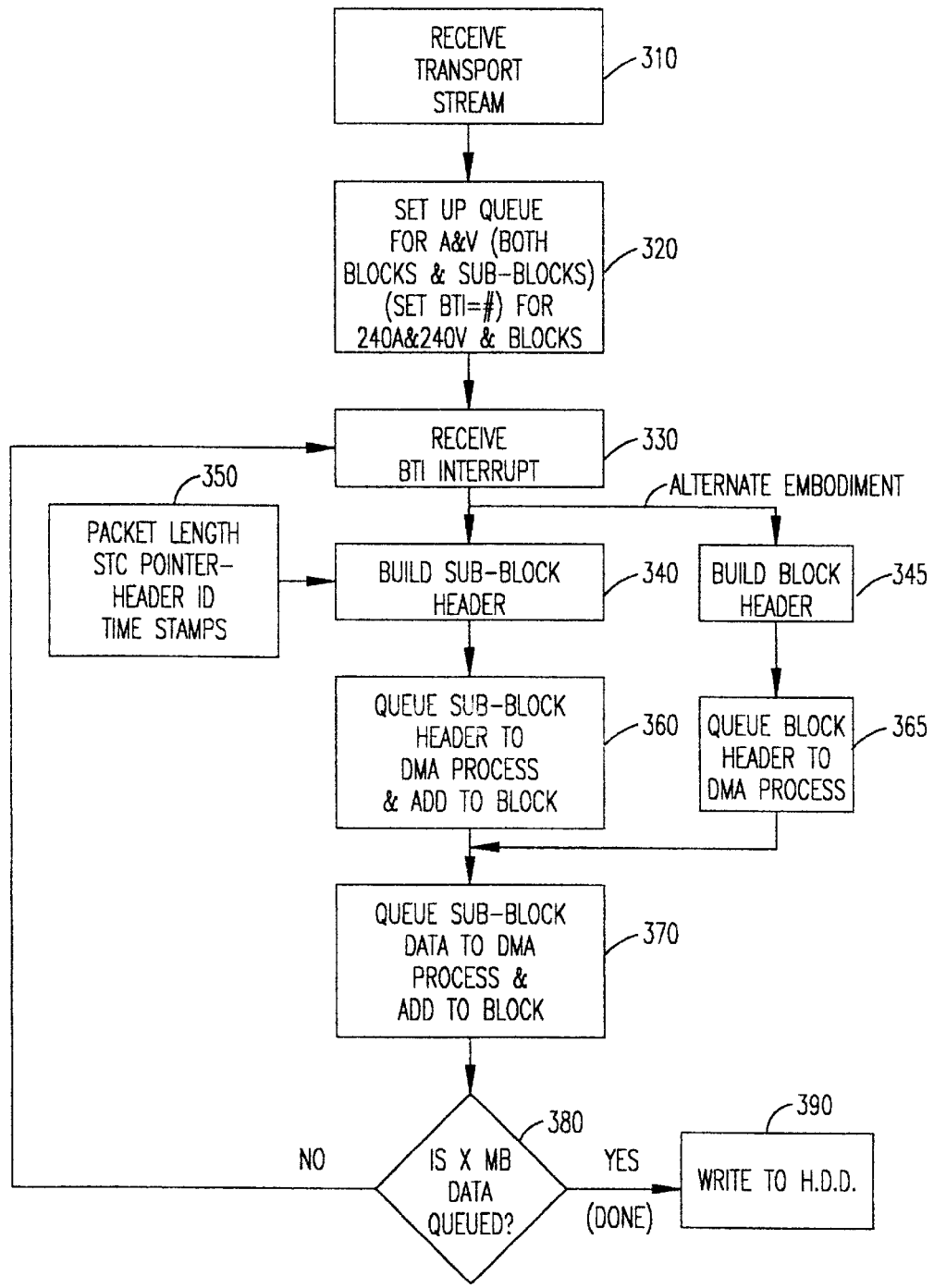
FIG. 3 is a flow chart illustrating operation of a preferred embodiment of the invention and an alternative embodiment.
Figure 4:
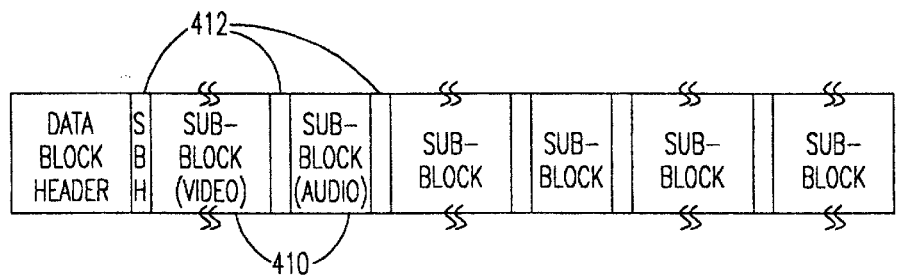
FIG. 4 illustrates data organization of a data block in accordance with a preferred embodiment of the invention.
Figure 4A:
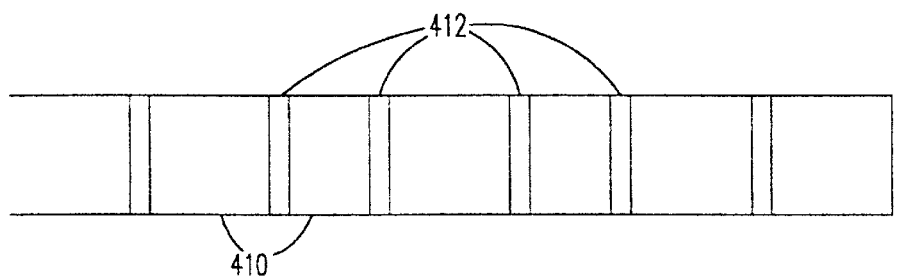
FIGS. 4A and 4B illustrate variant forms of data blocks similar to FIG. 4.
Figure 4B:
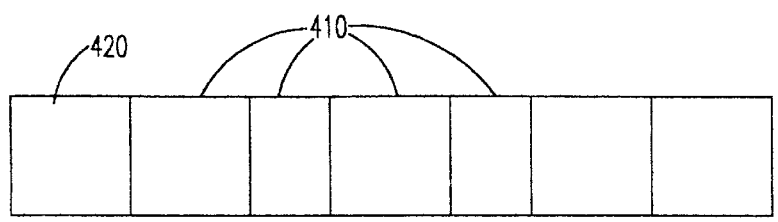

A generalized structure of a 1 MByte data block is illustrated in FIG. 4 in which any of the subblocks 410 may be audio or video data (but not both) and several sub-blocks 410, each with its own header 412 correspond to a data block as output from buffers 240A and 240V through multiplexer 260. The header 420 may be built as described above, and applied to the entire data block, preceding the group of sub-blocks. Alternatively, as illustrated at 345 and 365 of FIG. 3, a header can be built for the entire total data block and applied in a similar fashion to preface all data sub-blocks that would include the time reference stamps for all data sub-blocks within the total data block size stored to memory. Thus the data blocks may be of the form shown in FIG. 4, which is generalized and contains redundant representations of sub-block size, PTS and the like, or of either of the specific formats shown in FIGS. 4A and 4B, which differ by the format of the header.

The number of bytes to fill the total block size in the DMA process queue is preferably established by a counter, possibly with a comparator, but could be achieved by applying further BTIs to the data. However the filling of a total data block size buffer (preferably 1 Megabyte) is achieved, the process in accordance with the invention loops at 380 of FIG. 3 to 330 and the process of data transfer, sub-block counting or issuing of BTI interrupts and building and storage of headers continues until the full total data block size has been accumulated, whereupon the fixed size total data block is stored.

Figure 2:
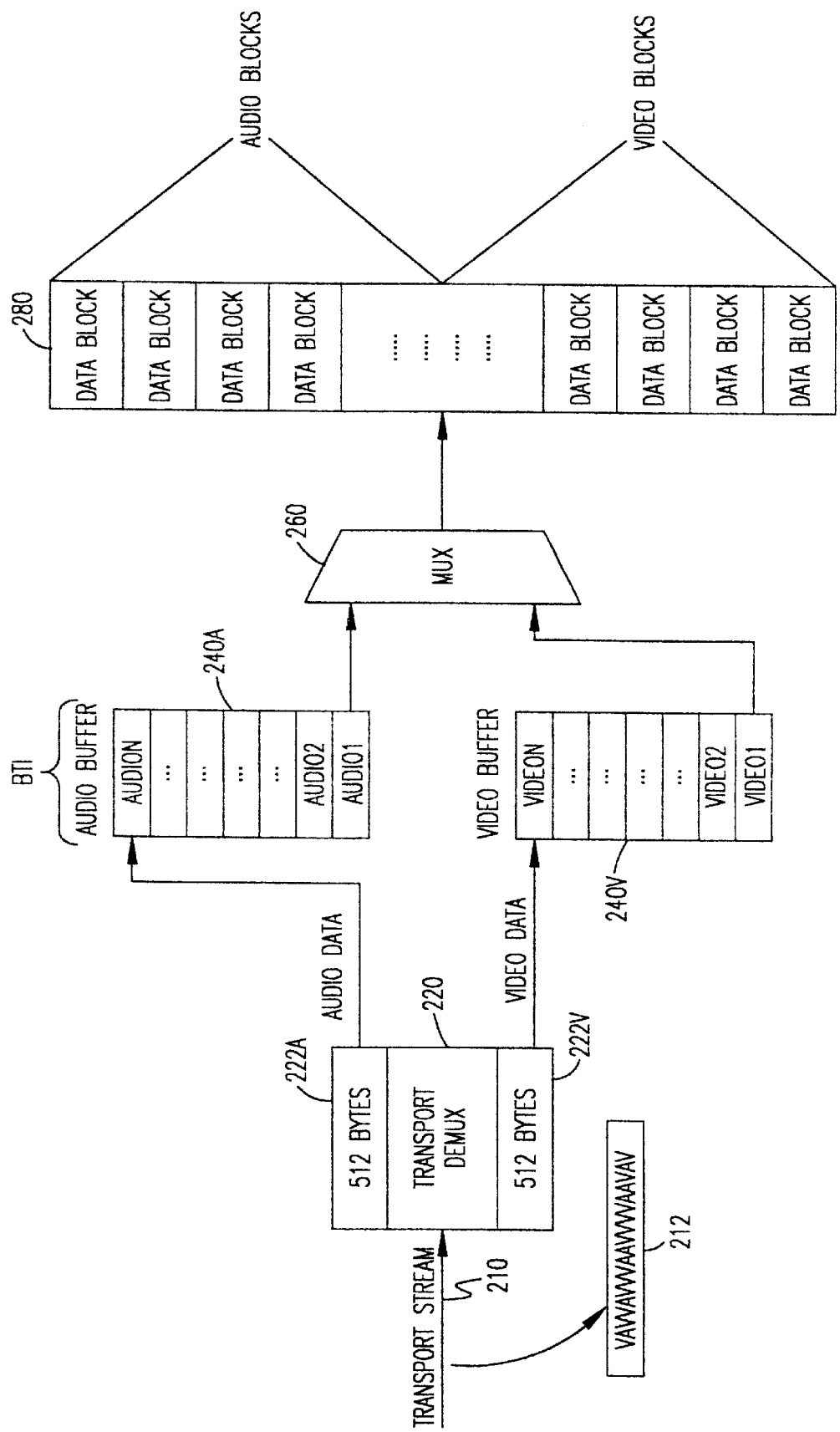
FIG. 2 illustrates the relationship of the multiplexer in accordance with the invention and decoder queue buffering in accordance with an MPEG-2 compliant set-top box architecture such as that of FIG. 1.

The total data block is illustrated at 280 of FIG. 2 (with audio and video data blocks grouped together for convenience of illustration only. In practice, types of data in data sub-blocks are interspersed in accordance with chronology of issuance of interrupts, as discussed above. Each data sub-block within the total data block size will include a header 412 (or a unitary header 420 provided for the total data block size or both) as described above and illustrated in FIGS. 4, 4A and 4B although omitted from FIG. 2 in the interest of clarity.

To summarize the invention as thus far described, the invention exploits the arrival rate of transport packets and respective data blocks assembled therefrom as multiplexed in the original transport stream to accommodate a given set of buffer requirements established in the MPEG-2 convention while generating a new, loosely multiplexed format in a single data stream but with a coarser granularity and larger buffer size and with audio and video data blocks chronologically arranged in interrupt order while remaining coded and compressed for limitation of required storage space. The separate PES streams can readily be separated from the common single stream, as stored, based on header information during readout from memory while the single stream is stored as a single file in memory and head motion to read two or more files concurrently is avoided and memory bandwidth maintained.

It should be appreciated that only the particular preferred buffer sizes are specific to the MPEG-2 standard and that the multiplexing process described above is fully applicable to any environment having two or more data streams, particularly if derived from a single data stream and particularly if time related. Even within other possible data transmitted in compliance with the MPEG standard, data or data streams other than audio and video data such data as sports statistics or subtitles for display, control signals for controlled access programming and the like can be multiplexed with other data streams to be available when needed while reducing the memory bandwidth requirements of any storage device to which the multiplexed data blocks are stored and from which they may be retrieved and readily separated in accordance with header information.

The invention as described above, and its meritorious effects may be further exploited to facilitate and/or enable other desirable functions of the set-top box, as will now be described. As alluded to above, It is desirable to emulate functions of a VCR in regard to locating a desired location within a given program. To do so in a manner analogous to a VCR within the architecture of a set-top box of a design prior to the present invention would require the reading of at least the stored video data at an accelerated rate several times faster than normal reading rate (which is only slightly ameliorated by not reading the much smaller audio data with the associated transducer head movement avoided by the invention as described above) and more rapid operation of the video decoder (similarly only slightly ameliorated by the need to present less than all the frames since the decompression and decoding involves reconstitution of redundant data in temporally adjacent frames).

Figure 5:
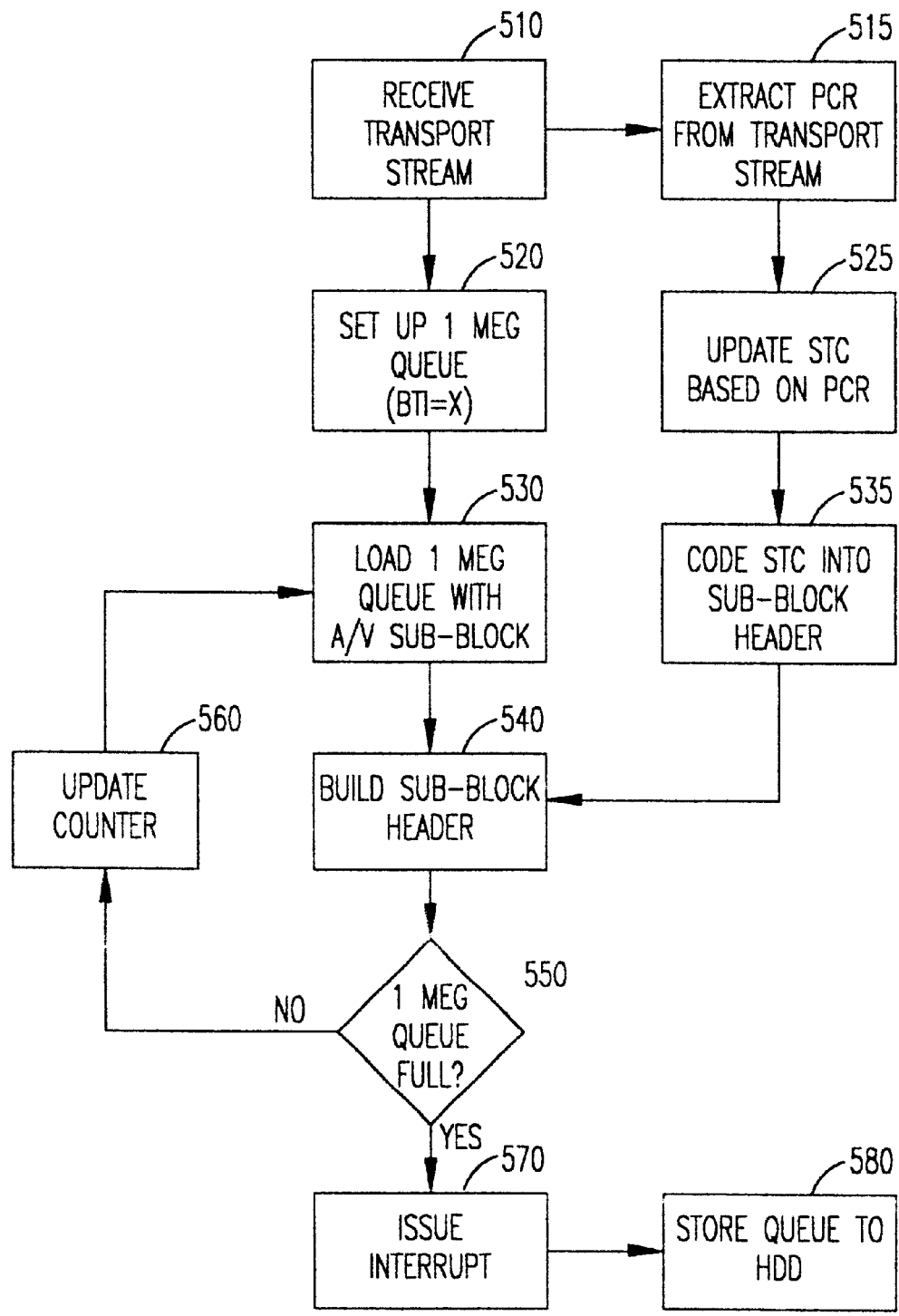
FIG. 5 is a flow chart illustrating encoding system time clock (STC) references into data block headers for storage consistent with the process of FIG. 3.

It will be recalled from the foregoing that Program Clock Reference (PCR) data is transmitted with and received from the transport stream. The local System Time Clock (STC) is updated periodically with the PCR signal and adjustment made to the local oscillator to maintain synchronism with the transport stream. The STC is then carried with the data in packet and/or data block headers during storage and retrieval to perform the same function as the PCR during playback. This process is illustrated in detail in FIG. 5 which should also be understood as the environment of the process described above in connection with FIG. 3. Again, while at the level of detail illustrated in FIG. 5 the process of generation and application of the STC to data is consistent with the MPEG-2 standard and may be employed independently of the aspects of the invention as described below, no portion of FIG. 5 is admitted to be prior art in regard to the invention.

Specifically, as the transport stream is received (510), two parallel processes are performed. A BTI value is set up to establish (e.g. count) the total data size of buffered data to be stored, as indicated to be preferred, above. A preferred value of the total data block size is 1 Megabyte, as illustrated at 520. The blocks of audio and video data are then queued to the buffers forming storage queues until the total data size established by the BTI value or count set at 520 is reached.

Concurrently, the PCR value is extracted from the transport stream as it is received, as shown at 515 and the STC is updated and the local oscillator frequency adjusted to synchronize the set-top box with the transport stream and the transmitted program as shown at 525. The STC value is then read from the local clock and coded into block (or sub-block) headers at 535 and the header for the stored block is built and concatenated with the data block or packet of the PES stream. Filling of the queue/fixed size buffer is tested at 550 and, until the total data size for storage has been accumulated, the process loops through 560 to adjust the BTI or count to step 530. When the fixed size buffer is full, a BTI interrupt is issued at 570 and the total data size is stored to the mass storage device 150, as shown at 580.

Figure 6:
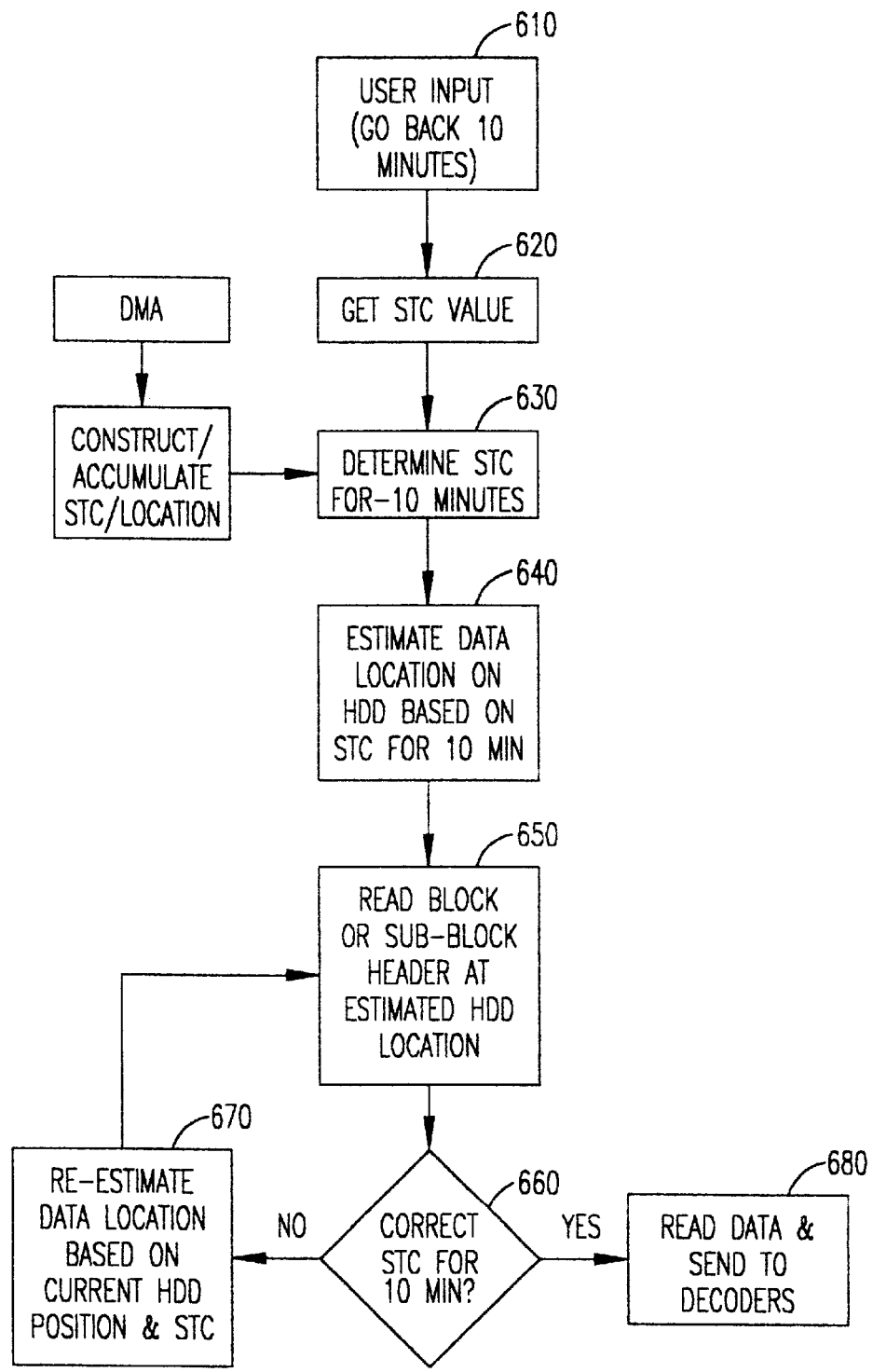
FIG. 6 is a flow chart illustrating operation of the invention to navigate through stored data to find a desired location in a program at low bandwidth memory access and data processing.

Referring now to FIG. 6, an emulation of fast forward or reverse playback in accordance with the invention will be explained. From the foregoing, it should be recalled that at any point in a program being played back from storage, a current STC value will exist in the set-top box circuitry and STC values will be associated with each stored data sub-block or total data block size. Therefore it is preferred that a user input take the form of going forward or backward by a given time increment; incrementing or decrementing the current STC value to develop a target STC value corresponding to a desired point in a program.

While, for simplicity of explanation, this discussion will assume that the user input will be to go backward in the program by ten minutes which could be implemented with a button or other form of key on the STB or any other user interface such as a graphic user interface (GUI), the user input could similarly be a command to go backward (or forward) in the program by any arbitrary increment such as ten frames and the command could be repeatedly issued in response to a button, key or other actuable portion of the interface corresponding to a fast forward or rewind key of a VCR.

Assuming the input is, in fact, a "go back 10 minutes" command, as illustrated at 610 during a play operation, the current STC is fetched from wherever it may be present in the set-top box, such as the video decoder 170 and a new target STC is computed by effectively subtracting a value corresponding to ten minutes from the current STC value, as shown at 630, which may be and preferably is accomplished using a look-up table correlating time within a program with an STC and which may be accumulated during initial storage. The location of the target data block is estimated (e.g. preferably by interpolation from a look-up table that may be formed, for example, to store a correspondence between STCs and locations on the mass storage medium) and a data block identification is made allowing the location to be found from the file allocation table (FAT) of the storage device or the like, as shown at 640.

Then, as shown at 650, the data header at the estimated location is read and compared to the computed STC at 660. If the STC in the header does not correspond to the computed STC, the location on the mass storage medium is again estimated from the previously estimated location, as shown at 670, and the process is repeated, looping to 650. When the correct STC is returned, the full data in the data block or total data block size is read out from memory and presented. The presentation can, of course, be interrupted by a further user command or a plurality thereof. In the case of an automatically repeated command for a small change in the STC, the estimate will generally be accurate on the first iteration and the reading and presentation may be performed immediately and interrupted by a further command after about one second or less. When this is done, the video decoder queues will be loaded with a portion of a total data block size sufficient to display one frame and can continue to present data from the queue while the STC for a repeated input is being computed and STCs compared; emulating display from a VCR.

In view of the foregoing, it is seen that the invention provides a multiplexing technique for merging the audio and video PES streams or any other concurrent data streams for storage such that the concurrent reading and writing of two files concurrently and the corresponding excessive transducer head motion can be avoided; restoring effective bandwidth of the storage device and ensuring availability of temporally concurrent data for presentation. These meritorious effects are achieved by exploiting rather than requiring any modification of the MPEG-2 convention for digital data transmission and can be further used to facilitate desired functions emulating functions of a VCR and allowing the navigation of a large program file to find a desired location in such a file with very low bandwidth data processing.

While the invention has been described in terms of a single preferred embodiment, those skilled in the art will recognize that the invention can be practiced with modification within the spirit and scope of the appended claims.

Having thus described my invention, what I claim as new and desire to secure by letters patent is as follows:

1. A method of multiplexing audio, video, and/or audio and video data streams for storage including steps of
    buffering each of first and second audio, video, and/or audio and video data streams
    defining sub-blocks in each of said first and second data streams by which said sub-blocks are read out to a multiplexer,
    queueing said sub-blocks into a data block in the order the sub-blocks are defined,
    remultiplexing the data in interrupt order to assure the sub-blocks with the most proximate presentation time stamps are adjacent to each other, and
    storing said data block in a storage device.

2. A method as recited in claim 1, wherein said step of defining sub-blocks is performed by
    setting bytes-to-interrupt (BTD values for each of said first and second data streams, and
    issuing BTI interrupts during said buffering of said first and second data streams, and wherein
    said queueing step is performed in order of issuance of BTI interrupts.

3. A method as recited in claim 1, wherein said storing step is performed upon accumulation of a data block of a fixed size.

4. A method as recited in claim 2, wherein said storing step is performed upon accumulation of a data block of a fixed size.

5. A method as recited in claim 1, including further step of building a header in accordance with a said sub-block of data.

6. A method as recited in claim 5, including the further step of queueing said header with said sub-block during said queueing step.

7. A method as recited in claim 5, including the further step of queueing said header with said data block during said queueing step.

8. A method as recited in claim 6, including the further step of queueing said header with said data block during said queueing step.

9. A method as recited in claim 5, including the further step of including a system time clock (STC) value or other clock reference in said header.

10. A method as recited in claim 9, including the further step of
    accumulating a look-up table correlating time values and storage locations during said storing step.

11. A method as recited in claim 10, including the further step of retrieving said data blocks.

12. A method of retrieving a data block from a storage location, including the steps of
    obtaining a current time value that pertains to a data block,
    incrementing or decrementing said current time value of said data block to form a target time value of an other data block,
    estimating a storage location of a said other data block in a storage medium containing data corresponding to said target time value, and
    retrieving said other data block from said location estimated in said estimating step.

13. A method as recited in claim 12, including the further steps of
    comparing a time value in said data block retrieved from said storage location estimated in said estimating step with said target time value, and
    repeating said estimating step.

14. A method as recited in claim 12, wherein said estimating step is performed with a look-up table.

15. A method as recited in claim 14, including the further steps of
    comparing a time value in said data block retrieved from said storage location estimated in said estimating step with said target time value, and
    repeating said estimating step.

16. A method as recited in claim 1, including further step of building a header in accordance with a said block of data.

17. A method as recited in claim 16, including the further step of queueing said header with said data block during said queueing step.

18. A method as recited in claim 16, including the further step of including a system time clock (STC) value or other clock reference in said header.

19. A method as recited in claim 18, including the further step of accumulating a look-up table correlating time values and storage locations during said storing step.

20. A method as recited in claim 19, including the further step of retrieving said data blocks.

* * * * *